US012771123B2

(12) United States Patent
Stockinger

(10) Patent No.: US 12,771,123 B2
(45) Date of Patent: Oct. 20, 2026

(54) ESD PROTECTION CIRCUIT AND METHOD THEREFOR

(71) Applicant: NXP USA, INC., Austin, TX (US)

(72) Inventor: Michael A Stockinger, Austin, TX (US)

(73) Assignee: NXP USA, Inc., Austin, TX (US)

( * ) Notice: Subject to any disclaimer, the term of this patent is extended or adjusted under 35 U.S.C. 154(b) by 155 days.

(21) Appl. No.: 18/768,173

(22) Filed: Jul. 10, 2024

(65) Prior Publication Data

US 2026/0018882 A1 Jan. 15, 2026

(51) Int. Cl.
*H02H 9/04* (2006.01)

(52) U.S. Cl.
CPC .................................. *H02H 9/045* (2013.01)

(58) Field of Classification Search
CPC ....... H02H 9/045; H02H 9/046; H10D 89/819
USPC ........................................................... 361/56
See application file for complete search history.

(56) References Cited

U.S. PATENT DOCUMENTS 5,406,228 A * 4/1995 Hoang .................. H03L 7/0995 331/25
6,288,572 B1 * 9/2001 Nowka .............. H03K 19/0963 326/14
7,804,669 B2 9/2010 Worley
8,010,927 B2 8/2011 Gauthier, Jr. et al.
10,224,817 B1 * 3/2019 Sharma ................ H03K 17/165
11,804,708 B2 * 10/2023 Chen ...................... H02H 9/046
2001/0028273 A1 * 10/2001 Minamizaki ........ H03F 3/45183 330/255
2004/0141267 A1 * 7/2004 Khazhinsky ......... H10D 89/815 361/56
2004/0240127 A1 * 12/2004 Juliano ................ H10D 12/211 257/E29.195
2005/0275989 A1 * 12/2005 Chen .................... H10D 89/811 361/93.1
2008/0191798 A1 * 8/2008 Chou ..................... G11C 5/147 327/589

(Continued)

FOREIGN PATENT DOCUMENTS

CN 106410773 B 9/2018

OTHER PUBLICATIONS

Chang, R., "Design of High-Voltage-Tolerant Power-Rail ESD Protection Circuit for Power Pin of Negative Voltage in Low-Voltage CMOS Processes", IEEE Transactions on Electron Devices, vol. 67, No. 1, Jan. 2020.

(Continued)

*Primary Examiner* — Dharti H Patel
(74) *Attorney, Agent, or Firm* — David G. Dolezal

(57) ABSTRACT

An electrostatic discharge (ESD) protection circuit is provided. The ESD protection circuit includes a clamp circuit coupled between a first voltage supply node and a second voltage supply node. The clamp circuit includes a first transistor coupled in series with a second transistor. The first transistor includes a control electrode coupled to the second voltage supply node by way of a first resistor. The second transistor includes a first current electrode coupled at the first voltage supply node. A trigger circuit coupled with the clamp circuit. The trigger circuit includes a first output coupled at the control electrode of the first transistor and a second output coupled at a control electrode of the second transistor.

20 Claims, 5 Drawing Sheets

(56) References Cited

U.S. PATENT DOCUMENTS

| | | | | |
|---|---|---|---|---|
| 2010/0148797 A1* | 6/2010 | Ker | H02H 9/046 | 324/555 |
| 2011/0195744 A1* | 8/2011 | Zhang | H02H 11/003 | 361/84 |
| 2013/0100561 A1* | 4/2013 | Senouci | H02H 9/046 | 327/564 |
| 2017/0221879 A1* | 8/2017 | Wang | H02H 9/046 | |
| 2018/0351352 A1* | 12/2018 | Chen | H02H 9/044 | |
| 2021/0281067 A1* | 9/2021 | Chen | H02H 9/046 | |
| 2022/0352711 A1* | 11/2022 | Chen | H02H 9/046 | |
| 2025/0317138 A1* | 10/2025 | Zhu | H02M 1/08 | |

OTHER PUBLICATIONS

Huang, S., "A High Voltage Tolerant Supply Clamp for ESD Protection in a 45-nm SOI Technology", 2022 IEEE International Reliability Physics Symposium (IRPS), Mar. 27-31, 2022.

Ker, M., "Overview on Electrostatic Discharge Protection Designs for Mixed-Voltage I/O Interfaces: Design Concept and Circuit Implementations", IEEE Transactions on Circuits and Systems—I: Regular Papers, vol. 53, No. 2, Feb. 2006.

Maloney, T.J., "Stacked PMOS Clamps for High Voltage Power Supply Protection", Electrical Overstress/Electrostatic Discharge Symposium Proceedings 1999, Sep. 28-30, 1999.

Parthasarathy, S., "ESD Protection Clamp with Active Feedback and Mis-Trigger immunity in 28nm CMOS Process", 2015 IEEE International Reliability Physics Symposium, Apr. 19-23, 2015.

* cited by examiner

ESD PROTECTION CIRCUIT AND METHOD THEREFOR

BACKGROUND

Field

This disclosure relates generally to electronic circuits, and more specifically, to semiconductor devices with an electrostatic discharge (ESD) protection circuit.

Related Art

Today, most sophisticated semiconductor devices incorporate circuitry configured ESD protection. For example, ESD protection circuits are commonly used in a variety of different applications and electronic products—from sewing machines to washing machines, from automobiles to cellular telephones, and so on. As process technology progresses, these semiconductor devices are expected to improve in reliability while increasing performance. However, challenges exist in balancing size, cost, performance, and long-term reliability.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a low leakage ESD protection circuit. The ESD protection circuit of a semiconductor device includes a trigger circuit and a clamp circuit. The trigger circuit includes an R-C transient circuit configured for detecting an electrostatic discharge (i.e., ESD event) and inverter stages configured for driving transistors of the clamp circuit during the ESD event. The clamp circuit includes a stack of ESD transistors (e.g., a plurality of ESD transistors connected in series) between power and ground supply rails. The ESD transistors are configured to form a shunt between the power and ground supply rails during the ESD event and sink current associated with the ESD event. After the R-C transient circuit detects an ESD event, the inverter stages drive the gate terminals of the ESD transistors causing the ESD transistors to conduct. In turn, the stacked ESD transistors sink the current associated with the ESD event. In a normal operating mode (e.g., non ESD event), the ESD transistors are configured in a low leakage mode. For example, the clamp circuit may include resistors connected between the gate and source terminals of respective ESD transistor each of the transistors of the stack of ESD transistors. The outputs of the inverter stages are configured in a high impedance state during the normal operating mode allowing each resistor to self-bias its respective transistor to a Vgs=0 Volts off state. By self-biasing the ESD transistors of the stack of ESD transistors in this manner, leakage current associated with the ESD transistors can be minimized during normal operating modes.

Figure 1:
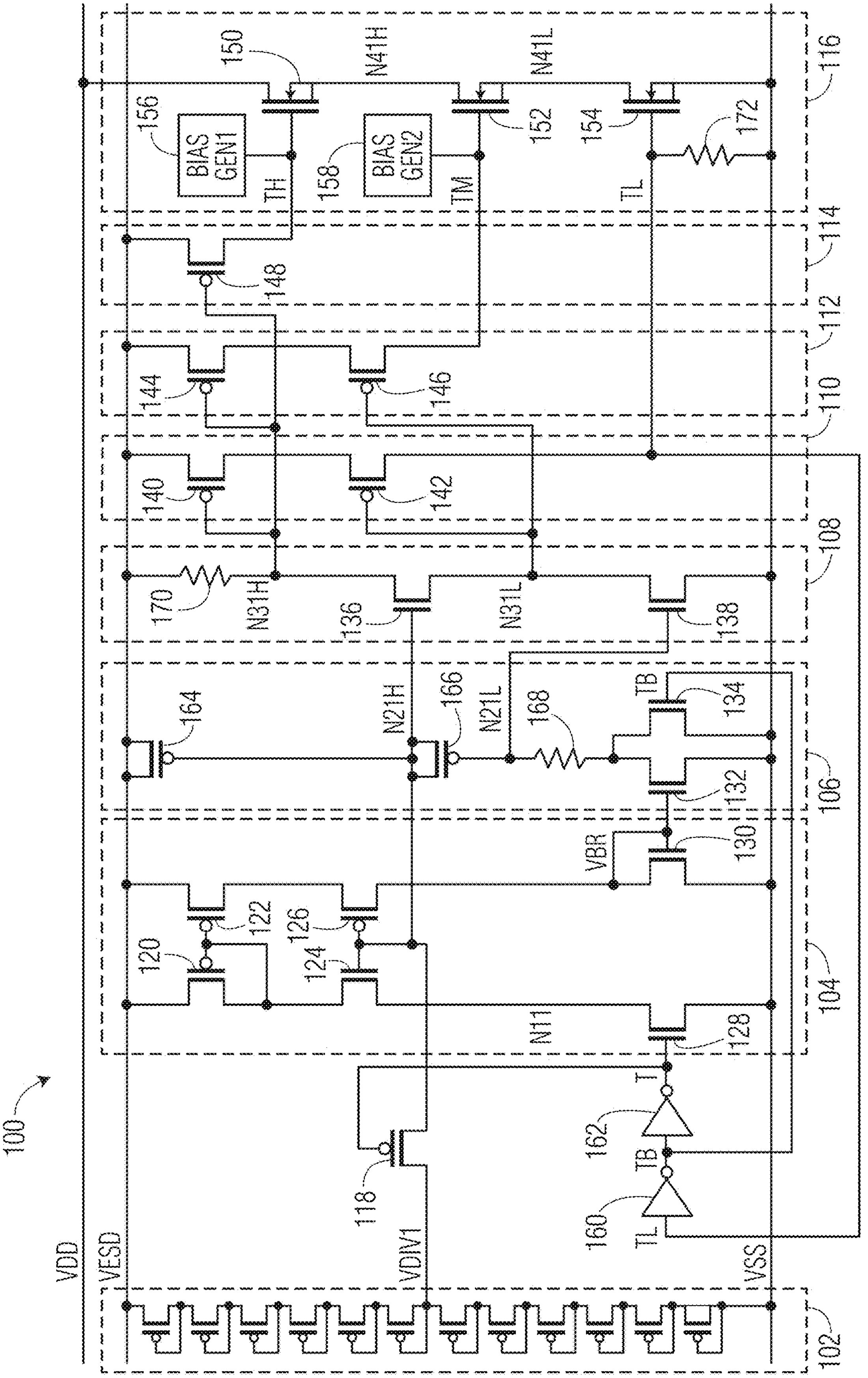
FIG. 1 illustrates, in a simplified schematic diagram form, an example ESD protection circuit in accordance with an embodiment.

FIG. 1 illustrates, in a simplified schematic diagram form, an example ESD protection circuit 100 in accordance with an embodiment. In this embodiment, the ESD protection circuit 100 includes voltage divider circuit 102, a reference current generator circuit 104, a resistor-capacitor (R-C) filter stage circuit 106, inverter stage circuits 108-114, and a clamp circuit 116. The reference current generator circuit 104, R-C stage circuit 106, and inverter stage circuits 108-114 together form an R-C-based transient trigger circuit of the ESD protection circuit 100. In this embodiment, the trigger circuit is coupled between an ESD rail node labeled VESD and a first supply node labeled VSS, and the clamp circuit 116 is coupled between a second supply node labeled VDD and the VSS supply node. In this embodiment, the VDD supply node is configured for supplying a positive operating voltage (e.g., ~3.3 volts at a 16 nm technology node) and the VSS supply node is configured for supplying a ground (e.g., zero volts) voltage. In some embodiments, the VDD supply node is configured for supplying positive operating voltages consistent with other technology nodes. In this embodiment, the VESD rail may be coupled to a plurality of input/output (I/O) pads and the VDD supply node. In some embodiments, the VDD supply node and the VESD rail may enable the trigger circuit to overdrive or "boost" the clamp circuit beyond the VDD supply voltage during an ESD event. In some embodiments, the VESD rail and VDD supply node may be merged together into a single VDD supply rail. For discussion purposes, the VESD rail node voltage may be characterized as substantially equal to the VDD supply node voltage during a normal operating mode (e.g., non-ESD events) and at or above the VDD supply node voltage during an ESD event.

In this embodiment, the voltage divider circuit 102 is configured as a plurality of P-channel transistors connected in series between the VESD rail node and the VSS supply node. Each of the series transistors include a first current electrode (e.g., drain) connected to its control electrode and a second current electrode (e.g., source) connected to the first current electrode of a preceding transistor in the series, except for the top most transistor having its second current electrode connected to the VESD rail node. In this embodiment, the transistors of the voltage divider circuit 102 are formed having substantially similar physical parameters (e.g., width, length) and electrical characteristics (e.g., I-V characteristics). The voltage divider circuit 102 is configured to generate a first reference voltage VDIV1 at a first tap node labeled VDIV1. In this embodiment, the VDIV1 node is configured to provide a voltage substantially equal to half of the VESD rail node voltage. Accordingly, a same number of the transistor are connected in series between the VDIV1 node and the VESD rail node as connected in series between the VDIV1 node and the VSS supply node.

The reference current generator circuit 104 includes P-channel transistors 120, 122, and 126, N-channel transistors 124, 128, and 130 coupled between the VESD rail node and the VSS supply node in the embodiment depicted in FIG. 1. The reference current generator circuit 104 is coupled with the voltage divider circuit 102 by way of P-channel pass transistor 118. Transistor 118 includes a first current electrode connected at the VDIV1 node, a second current electrode connected at an input of the reference current generator circuit 104 at a node labeled N21H, and a control electrode connected at a node labeled T. In this embodiment, the transistors 120, 124, and 128 are connected in series in a first branch and the transistors 122, 126, and 128 are connected in series in a second branch. A first current mirror is formed by transistors 120 and 122. The transistor 120 includes a first current electrode connected at the VESD rail node and a control electrode and a second current electrode connected at a first current electrode of transistor 124. The transistor 124 includes a control electrode connected at the N21H node, and a second current electrode connected at a node labeled N11. The transistor 128 includes a first current electrode connected at the node N11, a second current electrode connected at the VSS supply node, and a control electrode connected at the T node. In this embodiment, transistor 128 may be characterized as a switchable current source based on the logic level at the T node.

The transistor 122 includes a first current electrode connected at the VESD rail node, a control electrode connected at the control electrode of transistor 120, and a second current electrode connected at a first current electrode of transistor 126. The transistor 126 includes a control electrode connected at the N21H node, and a second current electrode connected at a bias reference node labeled VBR. A second current mirror is formed by transistor 130 and transistor 132 of the R-C filter stage circuit 106. The transistor 130 includes a first current electrode and a control electrode connected at the node VBR and a second current electrode connected at the VSS supply node. In this embodiment, the reference current generator circuit 104 is configured to generate a bias reference voltage VBR at the VBR node and in turn, generate a very small mirrored current through transistor 132 of the R-C filter stage circuit 106. It may be desirable to size the transistors of the reference current generator circuit 104 such that the branch current of the second branch is attenuated to reduce the bias reference voltage VBR. For example, the reference current generator circuit 104 may be configured such that the branch current of the second branch is approximately one-tenth of the branch current of the first branch.

The R-C filter stage circuit 106 includes capacitors 164 and 166, resistor 168, and N-channel transistors 132 and 134 coupled between the VESD rail node and the VSS supply node. The R-C filter stage circuit 106 is coupled to the output of the reference current generator circuit 104 at the VBR node. The R-C filter stage circuit 106 is configured to receive the bias reference voltage VBR generated at the output of the reference current generator circuit 104. In this embodiment, capacitors 164 and 166 are characterized as P-channel transistors configured as capacitors. The capacitor 164 includes a first terminal connected to the VESD rail node and a second terminal connected to the N21H node. The capacitor 166 includes a first terminal connected to the N21H node and a second terminal connected at a node labeled N21L. A first terminal of the resistor 168 is connected at the N21L node and a second terminal of the resistor 168 is connected at first current electrodes of transistors 132 and 134. The transistor 132 further includes a control electrode connected at the VBR node and a second current electrode connected at the VSS supply node. In this embodiment, the current mirror formed by transistors 130 and 132 is configured to generate a very small "bleed" current through transistor 132 to slowly charge the capacitors 164 and 166 during an ESD event. The transistor 134 further includes a control electrode connected at a node labeled TB and a second current electrode connected at the VSS supply node.

The inverter stage circuits 108-114 of the ESD protection circuit 100 are coupled between the VESD rail node and the VSS supply node. A first inverter stage circuit 108 is coupled to the N21H and N21L output nodes of the R-C filter stage circuit 106. In this embodiment, the first inverter stage circuit 108 includes a pull-up resistor 170 and N-channel transistors 136 and 138 connected in series between the VESD rail node and the VSS supply node. A first terminal of the resistor 170 is connected at the VESD rail node and a second terminal of the resistor 170 is connected at a first current electrodes of transistor 136 at node labeled N31H. A control electrode of transistor 136 is connected at the N21H node and a second current electrode of transistor 136 is connected to a first current electrode of transistor 138 at a node labeled N31L. A control electrode of transistor 138 is connected at the N21L node and a second current electrode of transistor 138 is connected to a first current electrode of transistor 138 at the VSS supply node.

A plurality of second inverter stage circuits 110, 112, 114 is coupled to the N31H and N31L output nodes of the first inverter stage circuit 108. In this embodiment, the inverter stage circuits 110, 112, 114 have respective trigger outputs labeled TL, TM, and TH coupled to corresponding clamp devices of the clamp circuit 116. The TL inverter stage circuit 110 includes P-channel transistors 140 and 142 connected in series. A first current electrode of transistor 140 is connected at the VESD rail node, a control electrode of transistor 140 is connected at the N31H node, and a second current electrode of transistor 140 is connected to a first current electrode of transistor 142. A control electrode of transistor 142 is connected at the N31L node and a second current electrode of transistor 142 is connected at the TL node. The TM inverter stage circuit 112 includes P-channel transistors 144 and 146 connected in series. A first current electrode of transistor 144 is connected at the VESD rail node, a control electrode of transistor 144 is connected at the N31H node, and a second current electrode of transistor 144 is connected to a first current electrode of transistor 146. A control electrode of transistor 146 is connected at the N31L node and a second current electrode of transistor 146 is connected at the TM node. The TH inverter stage circuit 114 includes P-channel transistor 148. A first current electrode of transistor 148 is connected at the VESD rail node, a control electrode of transistor 148 is connected at the N31H node, and a second current electrode of transistor 148 is connected at the TH node.

In this embodiment, the clamp circuit 116 includes N-channel clamp transistors 150, 152, and 154 connected in series between the VDD supply node and the VSS supply node. Each of the clamp transistors 150, 152, and 154 includes a body electrode connected to its source electrode as depicted in FIG. 1. A first current electrode (e.g., drain) of clamp transistor 150 is connected at the VDD supply node, a control electrode (e.g., gate) of transistor 150 is connected at the TH node, and a second current electrode (e.g., source) of transistor 150 is connected to a first current electrode (e.g., drain) of transistor 152 at a node labeled N41H. A control electrode (e.g., gate) of transistor 152 is connected at the TM node, and a second current electrode (e.g., source) of transistor 152 is connected to a first current electrode (e.g., drain) of transistor 154 at a node labeled N41L. A control electrode (e.g., gate) of transistor 154 is connected at the TL node, and a second current electrode (e.g., source) of transistor 154 is connected at the VSS supply node.

In this embodiment, a first bias generator circuit 156 is coupled at the control electrode of the clamp transistor 150 and a second bias generator circuit 158 is coupled at the control electrode of the clamp transistor 152. A pull-down resistor 172 includes a first terminal connected at the control electrode of the clamp transistor 154 and a second terminal at the VSS supply node. In this embodiment, the clamp transistors 150, 152, and 154 of the clamp circuit 116 are formed having substantially similar physical layouts including substantially similar physical parameters (e.g., width, length) and electrical characteristics (e.g., I-V characteristics). The clamp circuit 116 is configured to form a shunt between the VDD and VSS supply nodes during an ESD event and sink current associated with the ESD event.

In this embodiment, the first bias generator circuit 156 is configured to provide a first gate bias voltage at the control electrode of the clamp transistor 150 and the second bias generator circuit 158 is configured to provide a second gate bias voltage at the control electrode of the clamp transistor 152 during a normal operating mode. The first bias generator circuit 156 is configured to generate the first gate bias voltage to be substantially equal to two-thirds of the VDD voltage (i.e., ⅔*VDD). Likewise, the second bias generator circuit 158 is configured to generate the second gate bias voltage to be substantially equal to one-third of the VDD voltage (i.e., ⅓*VDD). Further, the resistor 172 is configured to provide a voltage at the control electrode of the clamp transistor 154 to be substantially equal to the voltage at the VSS supply node (e.g., 0 Volts) during a normal operating mode. Because each of the clamp transistors 150, 152, and 154 are configured to have substantially the same electrical characteristics, the gate-to-source voltage (Vgs) of the each of the clamp transistors 150 and 152 is substantially equal to the Vgs of the clamp transistor 154 (e.g. 0 Volts) during a normal operating mode. Therefore, the voltage at the N41L node is substantially equal to one-third of the VDD voltage (i.e., ⅓*VDD) and the voltage at the N41H node is substantially equal to two-thirds of the VDD voltage (i.e., ⅔*VDD) during a normal operating mode. In this embodiment, it is desirable for the drain-to-source voltage (Vds) of each of the clamp transistors 150, 152, and 154 to substantially equal one-third of the VDD voltage to minimize gate-induced drain leakage (GIDL) during a normal operating mode.

The trigger output node TL is coupled to an input terminal of inverter 160 in this embodiment. An output terminal of inverter 160 is connected to an input terminal of inverter 162 and the control electrode of transistor 134 at the TB node. An output terminal of inverter 162 is connected to the control electrode of transistor 118 and the control electrode of transistor 128 at the T node.

In a normal operation mode (e.g., non-ESD event), the transistors 140 and 142 of the inverter stage 110 are at an "off" state (e.g., open, not conducting) allowing resistor 172 to pull down the TL node to a logic low level. Accordingly, the TB node at the output of the inverter 160 is at a logic high level and therefore, the transistor 134 of the R-C filter stage circuit 106 is at an "on" state (e.g., closed, conducting) and the transistor 138 of the inverter stage circuit 108 is at an off state. While the TB node is at the logic high level, the T node at the output of the inverter 162 is at a logic low level. Thus, transistor 128 of the reference current generator circuit 104 is at an off state and pass transistor 118 is at an on state allowing the voltage at the N21H node to be substantially equal to the VDIV1 voltage of the voltage divider circuit 102. While the transistor 138 is at an off state, pull-up resistor 170 pulls up the N31H node to the voltage at the VESD rail node, and the N31L node is driven by transistor 136 to the VDIV1 node voltage. Thus, the transistors 140-148 of the inverter stage circuits 110-112 are at an off state. Therefore, a feedback loop is formed from the TL output of the inverter stage circuit 110 to the input of the inverter stage circuit 108.

During an ESD event, a voltage spike on the VESD rail node causes the voltage at the N21L node to increase (due to the capacitive coupling by way of capacitors 164 and 166) to a voltage level sufficient for transistor 138 of the inverter stage circuit 108 to transition to an on state. While transistor 138 is at the on state, the N31H and N31L nodes are pulled to the voltage at the VSS supply node causing the trigger output nodes TL, TM, and TH of the respective inverter stage circuits 110, 112, and 114 to be driven to the VESD rail node voltage. Accordingly, when the trigger output nodes TH, TM, and TL are driven to the VESD rail node voltage, the corresponding clamp transistors 150, 152, and 154 are turned on and sink ESD current from the VDD supply node to the VSS supply node. In this embodiment, the drive strengths of transistors 140-148 are sufficient to overcome the relatively weak biasing strength of resistor 172 and bias generator circuits 156 and 158 during an ESD event.

Figure 2:
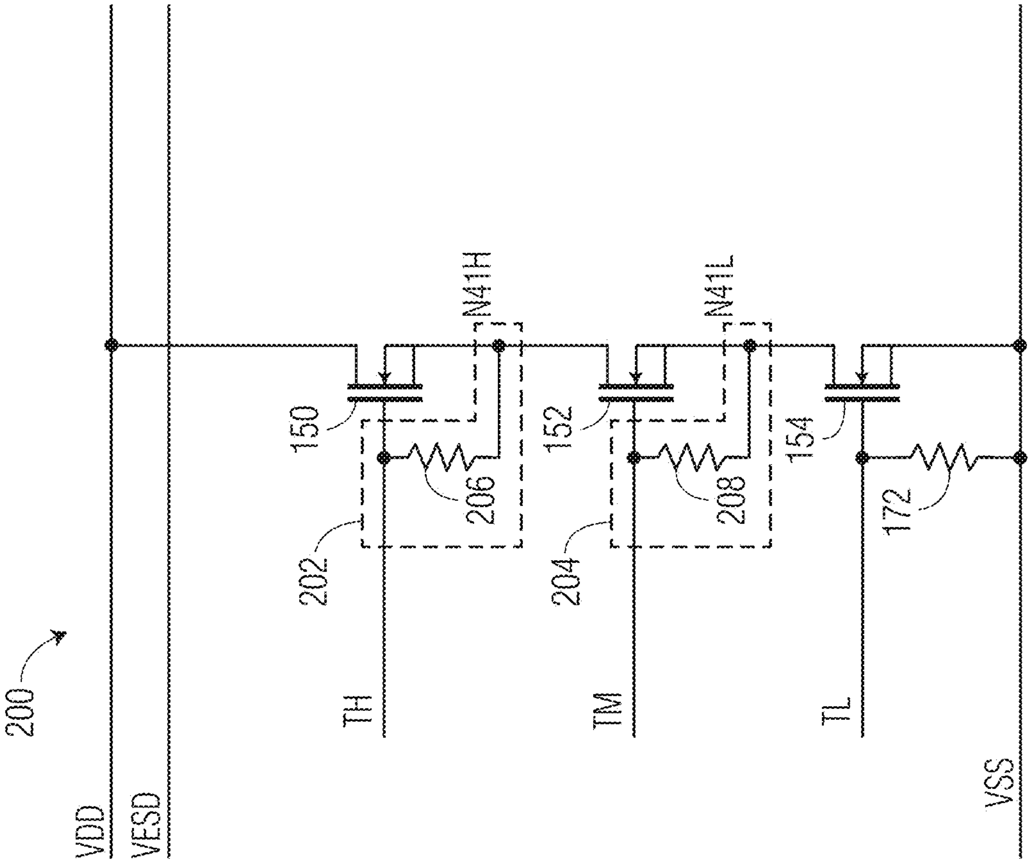
FIG. 2 illustrates, in a simplified schematic diagram form, an example implementation of bias generation for clamp device in accordance with an embodiment.

FIG. 2 illustrates, in a simplified schematic diagram form, an example implementation 200 of bias generation for respective clamp devices in accordance with an embodiment. In this embodiment, the example implementation 200 includes circuitry corresponding to the clamp circuit 116 (depicted in FIG. 1) and bias generator circuits 202 and 204 corresponding to the bias generator circuits 156 and 158 (depicted in FIG. 1) respectively. In this embodiment, the bias generator circuit 202 is implemented as a resistor 206 coupled between the control electrode of the clamp transistor 150 and the N41H node. The resistor 206 includes a first terminal connected at the control electrode of the clamp transistor 150 and a second terminal connected at the N41H node. Likewise, the bias generator circuit 204 is implemented as a resistor 208 coupled between the control electrode of the clamp transistor 152 and the N41L node. The resistor 208 includes a first terminal connected at the control electrode of the clamp transistor 152 and a second terminal connected at the N41L node. Accordingly, when the trigger output nodes TH, TM, and TL are not driven to a logic high level (e.g., normal operating mode), the respective resistors 206, 208, and 172 couple a respective voltage to the control electrodes in a self-biasing (off state) manner such that the Vgs of the each of the clamp transistors 150, 152, and 154 is substantially equal to 0 Volts.

Figure 3:
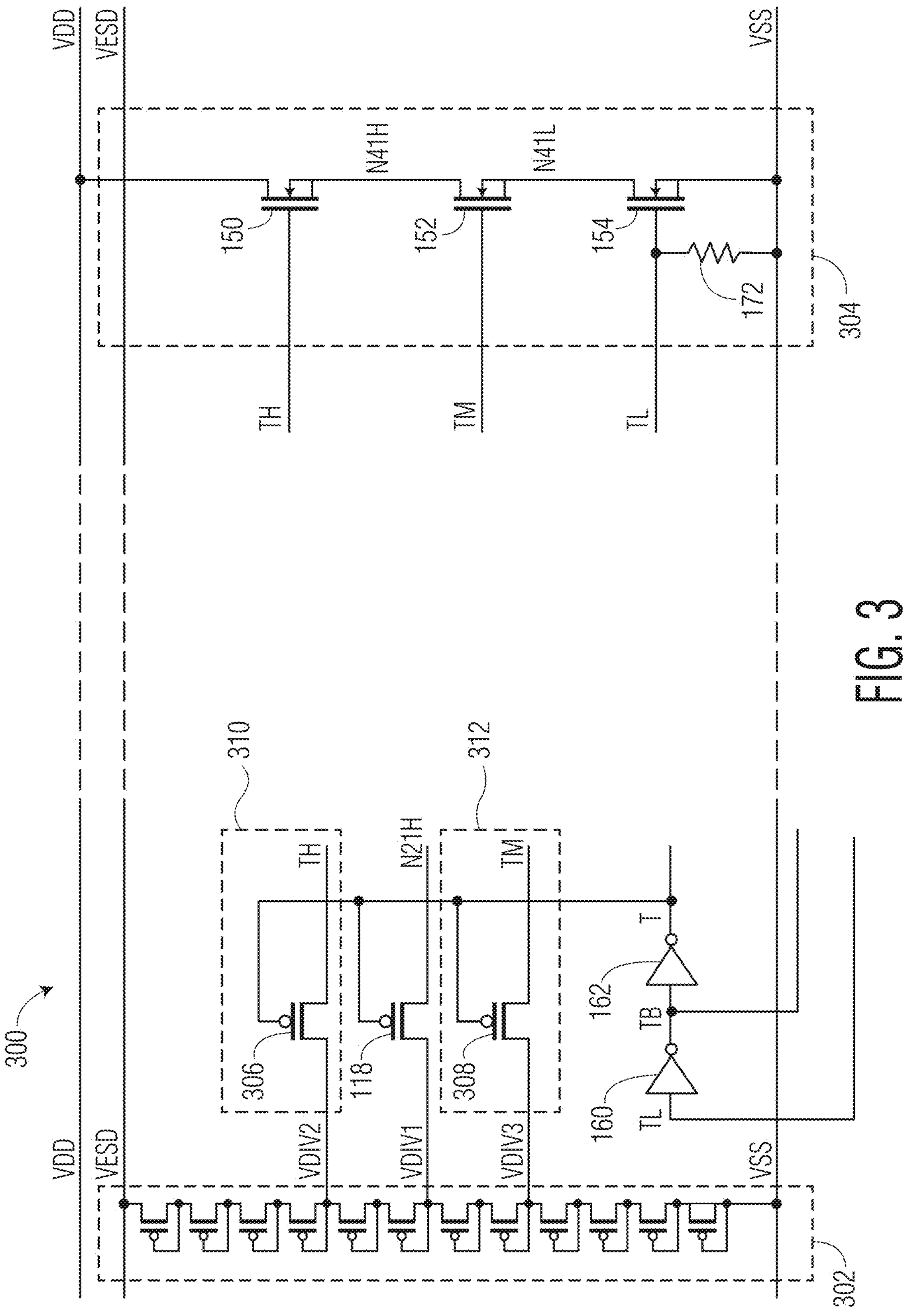
FIG. 3 illustrates, in a simplified schematic diagram form, an alternative example implementation of bias generation for clamp device in accordance with an embodiment.

FIG. 3 illustrates, in a simplified schematic diagram form, an alternative example implementation 300 of bias generation for respective clamp devices in accordance with an embodiment. In this embodiment, the example implementation 300 includes voltage divider circuit 302 corresponding to the voltage divider circuit 102 (depicted in FIG. 1), clamp circuit 304 corresponding to the clamp circuit 116 (depicted in FIG. 1), and bias generator circuits 310 and 312 corresponding to the bias generator circuits 156 and 158 (depicted in FIG. 1) respectively. In this embodiment, the bias generator circuit 310 is implemented as a P-channel pass transistor 306 coupled between the control electrode of the clamp transistor 150 and a second voltage tap node of the voltage divider circuit 302 labeled VDIV2. The transistor 306 includes a first current electrode connected at the VDIV2 node, a second current electrode connected at the control electrode of the clamp transistor 150, and a control electrode connected at the T node. Likewise, the bias generator circuit 312 is implemented as a P-channel pass transistor 308 coupled between the control electrode of the clamp transistor 152 and a third voltage tap node of the voltage divider circuit 302 labeled VDIV3. The transistor 308 includes a first current electrode connected at the VDIV3 node, a second current electrode connected at the control electrode of the clamp transistor 150, and a control electrode connected at the T node. In this embodiment, the voltage divider circuit 302 is configured to provide a voltage substantially equal to two-thirds of the VESD rail node voltage (e.g., ⅔*VDD) at the VDIV2 node and configured to provide a voltage substantially equal to one-third of the VESD rail node voltage (e.g., ⅓*VDD) at the VDIV3 node. Accordingly, when the control electrodes of transistors 306 and 308 are at a logic low level (and trigger output nodes TH, TM, and TL are not driven to a logic high level) during a normal operating mode, the VDIV2 and VDIV3 voltages are coupled to the respective control electrodes of the clamp transistors 150 and 152 such that the N41L node is substantially equal to one-third of the VDD voltage (i.e., ⅓*VDD) and the voltage at the N41H node is substantially equal to two-thirds of the VDD voltage (i.e., ⅔*VDD) because the Vgs of the each of the clamp transistors 150, 152, and 154 is substantially equal to 0 Volts.

Figure 4:
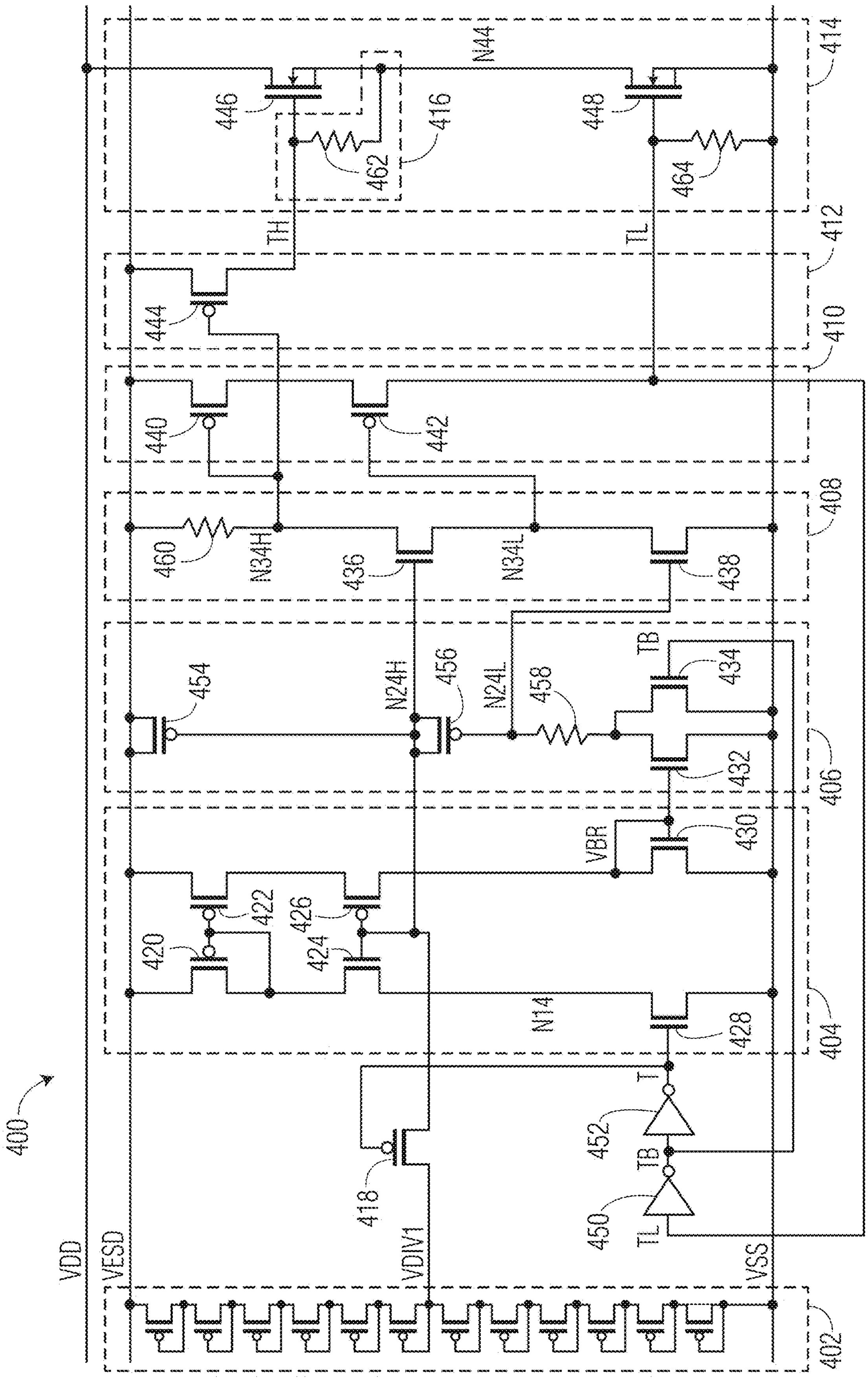
FIG. 4 illustrates, in a simplified schematic diagram form, an alternative example ESD protection circuit in accordance with an embodiment.

FIG. 4 illustrates, in a simplified schematic diagram form, an alternative example ESD protection circuit 400 in accordance with an embodiment. In this embodiment, the ESD protection circuit 400 includes voltage divider circuit 402, a reference current generator circuit 404, a resistor-capacitor (R-C) filter stage circuit 406, inverter stage circuits 408-412, and a clamp circuit 414. The reference current generator circuit 404, R-C stage circuit 406, and inverter stage circuits 408-412 together form an R-C-based transient trigger circuit of the ESD protection circuit 400. In this embodiment, the trigger circuit is coupled between an ESD rail node labeled VESD and a first supply node labeled VSS, and the clamp circuit 414 is coupled between a second supply node labeled VDD and the VSS supply node. In this embodiment, the VDD supply node is configured for supplying a positive operating voltage (e.g., ~3.3 volts at a 16 nm technology node) and the VSS supply node is configured for supplying a ground (e.g., zero volts) voltage. The VESD rail node serves as a separate supply rail for the trigger circuit. In this embodiment, the VESD rail may be coupled to a plurality of input/output (I/O) pads and the VDD supply node. In some embodiments, the separate supply rails (VDD and VESD) may enable the trigger circuit to overdrive or "boost" the clamp circuit beyond the VDD rail voltage during an ESD event. In some embodiments, the VESD and VDD rails may be merged together into a single VDD supply rail. For discussion purposes, the VESD rail node voltage may be characterized as substantially equal to the VDD supply node voltage during a normal operating mode (e.g., non-ESD events) and at or above the VDD supply node voltage during an ESD event.

In this embodiment, the voltage divider circuit 402 is configured as a plurality of P-channel transistors connected in series between the VESD rail node and the VSS supply node. In this embodiment, the voltage divider circuit 402 is configured to generate a first reference voltage VDIV1 at a first tap node labeled VDIV1. In this embodiment, the VDIV1 node is configured to provide a voltage substantially equal to half of the VESD rail node voltage. Accordingly, a same number of the transistor are connected in series between the VDIV1 node and the VESD rail node as connected in series between the VDIV1 node and the VSS supply node.

The reference current generator circuit 404 includes P-channel transistors 420, 422, and 426, N-channel transistors 424, 428, and 430 coupled between the VESD rail node and the VSS supply node in the embodiment depicted in FIG. 4. The reference current generator circuit 404 is coupled with the voltage divider circuit 402 by way of P-channel pass transistor 418. Transistor 418 includes a first current electrode connected at the VDIV1 node, a second current electrode connected at an input of the reference current generator circuit 404 at a node labeled N24H, and a control electrode connected at a node labeled T. In this embodiment, the transistors 420, 424, and 428 are connected in series in a first branch and the transistors 422, 426, and 428 are connected in series in a second branch. The transistor 420 includes a first current electrode connected at the VESD rail node and a control electrode and a second current electrode connected at a first current electrode of transistor 424. The transistor 424 includes a control electrode connected at the N24H node, and a second current electrode connected at a node labeled N14. The transistor 428 includes a first current electrode connected at the node N14, a second current electrode connected at the VSS supply node, and a control electrode connected at the T node.

The transistor 422 includes a first current electrode connected at the VESD rail node, a control electrode connected at the control electrode of transistor 420, and a second current electrode connected at a first current electrode of transistor 426. The transistor 426 includes a control electrode connected at the N24H node, and a second current electrode connected at a bias reference node labeled VBR. The transistor 430 includes a first current electrode and a control electrode connected at the node VBR and a second current electrode connected at the VSS supply node. In this embodiment, the reference current generator circuit 404 is configured to generate a bias reference voltage VBR at the VBR node.

The R-C filter stage circuit 406 includes capacitors 454 and 456, resistor 458, and N-channel transistors 432 and 434 coupled between the VESD rail node and the VSS supply node. The R-C filter stage circuit 406 is coupled to the output of the reference current generator circuit 404 at the VBR node. The R-C filter stage circuit 406 is configured to receive the bias reference voltage VBR generated at the output of the reference current generator circuit 404. In this embodiment, capacitors 454 and 456 are characterized as P-channel transistors configured as capacitors. The capacitor 454 includes a first terminal connected to the VESD rail node and a second terminal connected to the N24H node. The capacitor 456 includes a first terminal connected to the N24H node and a second terminal connected at a node labeled N21L. A first terminal of the resistor 458 is connected at the N24L node and a second terminal of the resistor 458 is connected at first current electrodes of transistors 432 and 434. The transistor 432 further includes a control electrode connected at the VBR node and a second current electrode connected at the VSS supply node. The transistor 434 further includes a control electrode connected at a node labeled TB and a second current electrode connected at the VSS supply node.

The inverter stage circuits 408-412 of the ESD protection circuit 400 are coupled between the VESD rail node and the VSS supply node. A first inverter stage circuit 408 is coupled to the N24H and N24L output nodes of the R-C filter stage circuit 406. In this embodiment, the first inverter stage circuit 408 includes a pull-up resistor 460 and N-channel transistors 436 and 438 connected in series between the VESD rail node and the VSS supply node. A first terminal of the resistor 460 is connected at the VESD rail node and a second terminal of the resistor 460 is connected at a first current electrodes of transistor 436 at node labeled N34H. A control electrode of transistor 436 is connected at the N24H node and a second current electrode of transistor 436 is connected to a first current electrode of transistor 438 at a node labeled N34L. A control electrode of transistor 438 is connected at the N24L node and a second current electrode of transistor 438 is connected to a first current electrode of transistor 438 at the VSS supply node.

A plurality of second inverter stage circuits 410 and 412 is coupled to the N34H and N34L output nodes of the first inverter stage circuit 408. In this embodiment, the inverter stage circuits 410 and 412 have respective trigger outputs labeled TL and TH coupled to corresponding clamp devices of the clamp circuit 414. The TL inverter stage circuit 410 includes P-channel transistors 440 and 442 connected in series. A first current electrode of transistor 440 is connected at the VESD rail node, a control electrode of transistor 440 is connected at the N34H node, and a second current electrode of transistor 440 is connected to a first current electrode of transistor 442. A control electrode of transistor 442 is connected at the N34L node and a second current electrode of transistor 442 is connected at the TL node. The TH inverter stage circuit 412 includes P-channel transistor 444. A first current electrode of transistor 444 is connected at the VESD rail node, a control electrode of transistor 444 is connected at the N34H node, and a second current electrode of transistor 444 is connected at the TH node.

In this embodiment, the clamp circuit 414 includes N-channel clamp transistors 446 and 448 connected in series between the VDD supply node and the VSS supply node. Each of the clamp transistors 446 and 448 includes a body electrode connected to its source electrode as depicted in FIG. 4. A first current electrode (e.g., drain) of clamp transistor 446 is connected at the VDD supply node, a control electrode (e.g., gate) of transistor 446 is connected at the TH node, and a second current electrode (e.g., source) of transistor 446 is connected to a first current electrode (e.g., drain) of transistor 448 at a node labeled N44. A control electrode (e.g., gate) of transistor 448 is connected at the TL node, and a second current electrode (e.g., source) of transistor 448 is connected at the VSS supply node. In this embodiment, the voltage at the N44 node is substantially equal to one-half of the VDD voltage (i.e., ½*VDD) during a normal operating mode. In this embodiment, the clamp transistors 446 and 448 of the clamp circuit 414 are formed having substantially similar physical layouts including substantially similar physical parameters (e.g., width, length) and electrical characteristics (e.g., I-V characteristics).

In this embodiment, a bias generator circuit 416 is coupled at the control electrode of the clamp transistor 446 and a pull-down resistor 172 is coupled at the control electrode of the clamp transistor 448. In this embodiment, the bias generator circuit 416 is implemented as a resistor 462 coupled between the control electrode of the clamp transistor 446 and the N44 node. The resistor 462 includes a first terminal connected at the control electrode of the clamp transistor 446 and a second terminal connected at the N44 node. Likewise, the resistor 464 includes a first terminal connected at the control electrode of the clamp transistor 448 and a second terminal connected at the VSS supply node. In this embodiment, the resistor 462 is configured to provide a voltage at the control electrode of the clamp transistor 446 to be substantially equal to one-half of the VDD voltage (i.e., ½*VDD) and the resistor 464 is configured to provide a voltage at the control electrode of the clamp transistor 448 to be substantially equal to the voltage at the VSS supply node during a normal operating mode. Because each of the clamp transistors 446 and 448 are configured to have substantially the same electrical characteristics, the Vgs of the clamp transistor 446 is substantially equal to the Vgs of the clamp transistor 448 (e.g. 0 Volts) during a normal operating mode. Therefore, the voltage at the N44 node is substantially equal to one-half of the VDD voltage (i.e., ½*VDD). The clamp circuit 414 is configured to form a shunt between the VDD and VSS supply nodes during an ESD event and sink current associated with the ESD event.

The trigger output node TL is coupled to an input terminal of inverter 450 in this embodiment. An output terminal of inverter 450 is connected to an input terminal of inverter 452 and the control electrode of transistor 434 at the TB node. An output terminal of inverter 452 is connected to the control electrode of transistor 418 and the control electrode of transistor 428 at the T node.

In a normal operation mode (e.g., non-ESD event), the transistors 440 and 442 of the inverter stage 410 are at an off state allowing resistor 464 to pull down the TL node to a logic low level. Accordingly, the TB node at the output of the inverter 450 is at a logic high level and therefore, the transistor 434 of the R-C filter stage circuit 406 is at an on state and the transistor 438 of the inverter stage circuit 408 is at an off state. While the TB node is at the logic high level, the T node at the output of the inverter 452 is at a logic low level. Thus, transistor 428 of the reference current generator circuit 404 is at an off state and pass transistor 418 is at an on state allowing the voltage at the N24H node to be substantially equal to the VDIV1 voltage of the voltage divider circuit 402. While the transistor 438 is at an off state, pull-up resistor 460 pulls up the N34H node to the voltage at the VESD rail node, and the N34L node is driven by transistor 436 to the VDIV1 node voltage. Thus, the transistors 440-444 of the inverter stage circuits 410 and 412 are at an off state. Therefore, a feedback loop is formed from the TL output of the inverter stage circuit 410 to the input of the inverter stage circuit 408.

During an ESD event, a voltage spike on the VESD rail node causes the voltage at the N24L node to increase (due to the capacitive coupling by way of capacitors 454 and 456) to a voltage level sufficient for transistor 438 of the inverter stage circuit 408 to transition to an on state. While transistor 438 is at the on state, the N34H and N34L nodes are pulled to the voltage at the VSS supply node (e.g., 0 Volts) causing the trigger output nodes TL and TH of the respective inverter stage circuits 410 and 412 to be driven to the VESD rail node voltage. Accordingly, when the trigger output nodes TH and TL are driven to the VESD rail node voltage, the corresponding clamp transistors 446 and 448 are turned on and sink ESD current from the VDD supply node to the VSS supply node.

Figure 5:
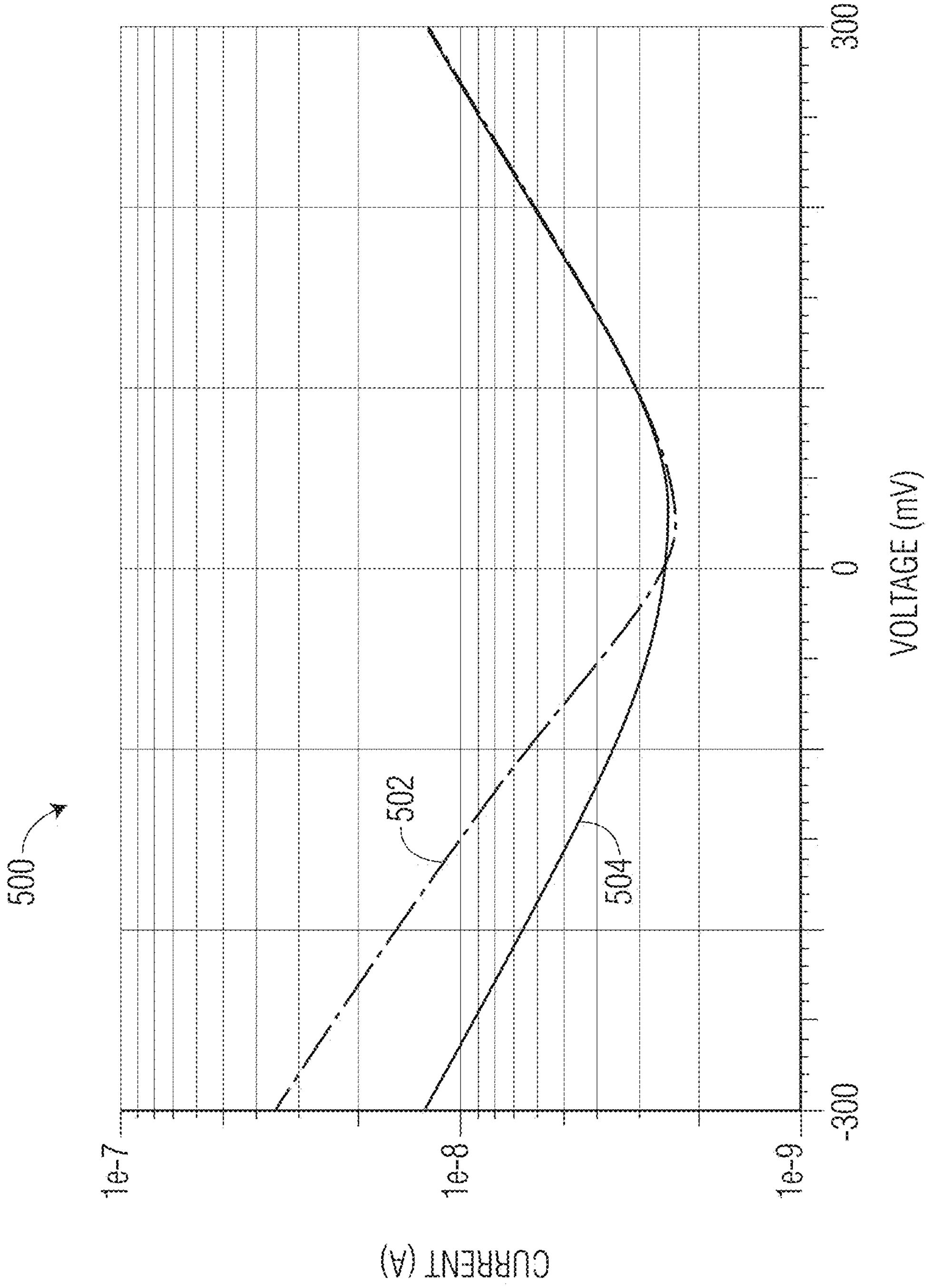
FIG. 5 illustrates, in a simplified graph diagram form, an example simulation result of the ESD protection circuit in accordance with an embodiment.

FIG. 5 illustrates, in a simplified graph diagram form, an example simulation current-voltage plot 500 of the ESD protection circuit in accordance with an embodiment. The current versus voltage plot 500 includes a first waveform 502 and a second waveform 504 corresponding to simulation results of clamp circuitry depicted in FIGS. 1 and 2. Voltage values in milliVolts (mV) are indicated on the X-axis labeled VOLTAGE, and corresponding current values in Amperes (A) are indicated on the Y-axis labeled CURRENT. The waveform 502 is an example waveform representative of changes in leakage current caused by differences between the gate voltage (at the TH node) and two-thirds of the VDD voltage (i.e., ⅔*VDD), and the waveform 504 is an example waveform representative of leakage current caused by differences between the gate voltage (at the TM node) and one-third of the VDD voltage (i.e., ⅓*VDD).

In the plot 500, the waveform 502 shows an increase in leakage current when the voltage at the gate terminal of clamp transistor 150 deviates from the two-thirds of the VDD voltage (i.e., ⅔*VDD). Likewise, the waveform 504 shows an increase in leakage current when the voltage at the gate terminal of clamp transistor 152 deviates from the one-third of the VDD voltage (i.e., ⅓*VDD). With the VDD supply node voltage divided equally across the clamp devices, a voltage deviation at the gate terminal of a clamp transistor may result in an overall increase in leakage current, as shown in FIG. 5. Accordingly, leakage current of each clamp transistor is minimized when the voltage at the gate and source terminals is substantially the same (i.e., Vgs=0 Volts). For low power devices, it is therefore desirable to minimize the leakage current of the clamp transistors.

Generally, there is provided, an ESD protection circuit including a clamp circuit coupled between a first voltage supply node and a second voltage supply node, the clamp circuit including: a first transistor having a first current electrode, a second current electrode coupled at the second voltage supply node, and a control electrode coupled to the second voltage supply node by way of a first resistor; a second transistor coupled in series with the first transistor, the second transistor having a first current electrode coupled at the first voltage supply node, a second current electrode, and a control electrode; a first bias generator circuit coupled at the control electrode of the second transistor, the first bias generator circuit configured to cause a gate-to-source voltage of the second transistor to be substantially equal to a gate-to-source voltage of the first transistor during a normal operating mode; and a trigger circuit coupled with the clamp circuit, the trigger circuit having a first output coupled at the control electrode of the first transistor and a second output coupled at the control electrode of the second transistor. The first bias generator circuit may include a second resistor having a first terminal coupled at the control electrode of the second transistor and a second terminal coupled at the second current electrode of the second transistor. The clamp circuit may further include a third transistor coupled in series between the first transistor and the second transistor, the third transistor having a first current electrode coupled at the second current electrode of the second transistor, a second current electrode coupled at the first current electrode of the first transistor, and a control electrode. The clamp circuit may further include a second bias generator circuit coupled at the control electrode of the third transistor, the second bias generator circuit configured to cause a gate-to-source voltage of the third transistor to be substantially equal to the gate-to-source voltage of the first transistor during the normal operating mode. The trigger circuit may include: a first inverter stage including: a first trigger transistor having a first current electrode, a second current electrode coupled at a third voltage supply node, a control electrode coupled at a first trigger node; a second trigger transistor having a first current electrode coupled at the first output of the trigger circuit, a second current electrode coupled at the first current electrode of the first trigger transistor, a control electrode coupled at a second trigger node; and a second inverter stage including: a third trigger transistor having a first current electrode coupled at the second output of the trigger circuit, a second current electrode coupled at the third voltage supply node, a control electrode coupled at the first trigger node. The trigger circuit may further include: an R-C stage coupled between the second voltage supply node and the third voltage supply node; and a third inverter stage having an input coupled to an output of the R-C stage and an output coupled to an input of the first and second inverter stages. The ESD protection circuit may further include a voltage divider circuit coupled with the trigger circuit, the voltage divider circuit having a first tap and configured to generate a first reference voltage at the first tap. The first reference voltage at the first tap may be characterized as a voltage value substantially equal to one half of the voltage value across the voltage divider circuit. The voltage divider circuit may include a second tap coupled at the control electrode of the second transistor, the second tap configured as the first bias generator circuit.

In another embodiment, there is provided, an ESD protection circuit including: a clamp circuit coupled between a first voltage supply node and a second voltage supply node, the clamp circuit including: a first transistor having a first current electrode, a second current electrode coupled at the second voltage supply node, and a control electrode coupled to the second voltage supply node by way of a first resistor; a second transistor coupled in series with the first transistor, the second transistor having a first current electrode coupled at the first voltage supply node, a second current electrode, and a control electrode coupled to the second current electrode of the second transistor by way of a second resistor; a first bias generator circuit coupled at the control electrode of the second transistor, the first bias generator circuit configured to cause a gate-to-source voltage of the second transistor to be substantially equal to a gate-to-source voltage of the first transistor during a normal operating mode; and a trigger circuit coupled with the clamp circuit, the trigger circuit having a first output coupled at the control electrode of the first transistor and a second output coupled at the control electrode of the second transistor, the trigger circuit configured to turn on the first transistor and the second transistor of the clamp circuit during an ESD event. The clamp circuit may further include a third transistor coupled in series between the first transistor and the second transistor, the third transistor having a first current electrode coupled at the second current electrode of the second transistor, a second current electrode coupled at the first current electrode of the first transistor, and a control electrode. The clamp circuit may further include a third resistor coupled between the control electrode of the third transistor and the second current electrode of the third transistor. The trigger circuit may include: a first inverter stage including: a first trigger transistor having a first current electrode, a second current electrode coupled at a third voltage supply node, a control electrode coupled at a first trigger node; a second trigger transistor having a first current electrode coupled at the first output of the trigger circuit, a second current electrode coupled at the first current electrode of the first trigger transistor, a control electrode coupled at a second trigger node; and a second inverter stage including: a third trigger transistor having a first current electrode coupled at the second output of the trigger circuit, a second current electrode coupled at the third voltage supply node, a control electrode coupled at the first trigger node. The trigger circuit may further include: an R-C stage coupled between the second voltage supply node and the third voltage supply node; and a third inverter stage having an input coupled to an output of the R-C stage and an output coupled to an input of the first and second inverter stages. The ESD protection circuit may further include a voltage divider circuit coupled with the trigger circuit, the voltage divider circuit having a first tap and configured to generate a first reference voltage at the first tap.

In yet another embodiment, there is provided, an ESD protection circuit including: a clamp circuit coupled between a first voltage supply node and a second voltage supply node, the clamp circuit including: a first transistor having a first current electrode, a second current electrode coupled at the second voltage supply node, a control electrode coupled to the second voltage supply node by way of a first resistor, and a body electrode coupled at the second voltage supply node; a second transistor having a first current electrode, a second current electrode coupled at the first current electrode of the first transistor at a first clamp node, a control electrode, and a body electrode coupled at the second current electrode; a third transistor having a first current electrode coupled at the first voltage supply node, a second current electrode coupled at the first current electrode of the second transistor at a second clamp node, a control electrode, and a body electrode coupled at the second current electrode; a first bias generator circuit coupled at the control electrode of the second transistor; a second bias generator circuit coupled at the control electrode of the third transistor; and a trigger circuit coupled with the clamp circuit, the trigger circuit having a first output coupled at the control electrode of the first transistor, a second output coupled at the control electrode of the second transistor, and a third output coupled at the control electrode of the third transistor. The ESD protection circuit may further include a voltage divider circuit coupled with the trigger circuit, the voltage divider circuit having a first tap and configured to generate a first reference voltage at the first tap. The trigger circuit may be coupled to receive the first reference voltage during a normal operating mode. The first bias generator circuit may include a second resistor having a first terminal coupled at the control electrode of the second transistor and a second terminal coupled at the second current electrode of the second transistor, and wherein the second bias generator circuit may include a third resistor having a first terminal coupled at the control electrode of the third transistor and a second terminal coupled at the second current electrode of the third transistor. The first bias generator circuit may be configured such that a voltage at the first clamp node is substantially equal to ⅓ of the voltage at the first voltage supply node, and wherein the second bias generator circuit may be configured such that a voltage at the second clamp node is substantially equal to ⅔ of the voltage at the first voltage supply node.

By now it should be appreciated that there has been provided, a low leakage ESD protection circuit. The ESD protection circuit of a semiconductor device includes a trigger circuit and a clamp circuit. The trigger circuit includes an R-C transient circuit configured for detecting an ESD event and inverter stages configured for driving transistors of the clamp circuit during the ESD event. The clamp circuit includes a stack of ESD transistors (e.g., a plurality of ESD transistors connected in series) between power and ground supply rails. The ESD transistors are configured to form a shunt between the power and ground supply rails during the ESD event and sink current associated with the ESD event. After the R-C transient circuit detects an ESD event, the inverter stages drive the gate terminals of the ESD transistors causing the ESD transistors to conduct. In turn, the stacked ESD transistors sink the current associated with the ESD event. In a normal operating mode (e.g., non ESD event), the ESD transistors are configured in a low leakage mode. For example, the clamp circuit may include resistors connected between the gate and source terminals of respective ESD transistor each of the transistors of the stack of ESD transistors. The outputs of the inverter stages are configured in a high impedance state during the normal operating mode allowing each resistor to self-bias its respective transistor to a Vgs=0 Volts off state. By self-biasing the ESD transistors of the stack of ESD transistors in this manner, leakage current associated with the ESD transistors can be minimized during normal operating modes.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms “a” or “an,” as used herein, are defined as one or more than one. Also, the use of introductory phrases such as “at least one” and “one or more” in the claims should not be construed to imply that the introduction of another claim element by the indefinite articles “a” or “an” limits any particular claim containing such introduced claim element to inventions containing only one such element, even when the same claim includes the introductory phrases “one or more” or “at least one” and indefinite articles such as “a” or “an.” The same holds true for the use of definite articles.

Unless stated otherwise, terms such as “first” and “second” are used to arbitrarily distinguish between the elements such terms describe. Thus, these terms are not necessarily intended to indicate temporal or other prioritization of such elements.

What is claimed is:

1. An electrostatic discharge (ESD) protection circuit comprising:

a clamp circuit coupled between a first voltage supply node and a second voltage supply node, the clamp circuit including:

a first transistor having a first current electrode, a second current electrode coupled at the second voltage supply node, and a control electrode coupled to the second voltage supply node by way of a first resistor;

a second transistor coupled in series with the first transistor, the second transistor having a first current electrode coupled at the first voltage supply node, a second current electrode, and a control electrode;

a first bias generator circuit coupled at the control electrode of the second transistor, the first bias generator circuit configured to cause a gate-to-source voltage of the second transistor to be substantially equal to a gate-to-source voltage of the first transistor during a normal operating mode; and a trigger circuit coupled with the clamp circuit, the trigger circuit having a first output coupled at the control electrode of the first transistor and a second output coupled at the control electrode of the second transistor.

2. The ESD protection circuit of claim 1, wherein the first bias generator circuit comprises a second resistor having a first terminal coupled at the control electrode of the second transistor and a second terminal coupled at the second current electrode of the second transistor.

3. The ESD protection circuit of claim 1, wherein the clamp circuit further includes a third transistor coupled in series between the first transistor and the second transistor, the third transistor having a first current electrode coupled at the second current electrode of the second transistor, a second current electrode coupled at the first current electrode of the first transistor, and a control electrode.

4. The ESD protection circuit of claim 3, wherein the clamp circuit further includes a second bias generator circuit coupled at the control electrode of the third transistor, the second bias generator circuit configured to cause a gate-to-source voltage of the third transistor to be substantially equal to the gate-to-source voltage of the first transistor during the normal operating mode.

5. The ESD protection circuit of claim 1, wherein the trigger circuit includes:

a first inverter stage including:

a first trigger transistor having a first current electrode, a second current electrode coupled at a third voltage supply node, a control electrode coupled at a first trigger node;

a second trigger transistor having a first current electrode coupled at the first output of the trigger circuit, a second current electrode coupled at the first current electrode of the first trigger transistor, a control electrode coupled at a second trigger node; and a second inverter stage including:

a third trigger transistor having a first current electrode coupled at the second output of the trigger circuit, a second current electrode coupled at the third voltage supply node, a control electrode coupled at the first trigger node.

6. The ESD protection circuit of claim 5, wherein the trigger circuit further includes:

an R-C stage coupled between the second voltage supply node and the third voltage supply node; and a third inverter stage having an input coupled to an output of the R-C stage and an output coupled to an input of the first and second inverter stages.

7. The ESD protection circuit of claim 1, further comprising a voltage divider circuit coupled with the trigger circuit, the voltage divider circuit having a first tap and configured to generate a first reference voltage at the first tap.

8. The ESD protection circuit of claim 7, wherein the first reference voltage at the first tap is characterized as a voltage value substantially equal to one half of the voltage value across the voltage divider circuit.

9. The ESD protection circuit of claim 7, wherein the voltage divider circuit includes a second tap coupled at the control electrode of the second transistor, the second tap configured as the first bias generator circuit.

10. An electrostatic discharge (ESD) protection circuit comprising:

a clamp circuit coupled between a first voltage supply node and a second voltage supply node, the clamp circuit including:

a first transistor having a first current electrode, a second current electrode coupled at the second voltage supply node, and a control electrode coupled to the second voltage supply node by way of a first resistor;

a second transistor coupled in series with the first transistor, the second transistor having a first current electrode coupled at the first voltage supply node, a second current electrode, and a control electrode coupled to the second current electrode of the second transistor by way of a second resistor;

a first bias generator circuit coupled at the control electrode of the second transistor, the first bias generator circuit configured to cause a gate-to-source voltage of the second transistor to be substantially equal to a gate-to-source voltage of the first transistor during a normal operating mode; and a trigger circuit coupled with the clamp circuit, the trigger circuit having a first output coupled at the control electrode of the first transistor and a second output coupled at the control electrode of the second transistor, the trigger circuit configured to turn on the first transistor and the second transistor of the clamp circuit during an ESD event.

11. The ESD protection circuit of claim 10, wherein the clamp circuit further includes a third transistor coupled in series between the first transistor and the second transistor, the third transistor having a first current electrode coupled at the second current electrode of the second transistor, a second current electrode coupled at the first current electrode of the first transistor, and a control electrode.

12. The ESD protection circuit of claim 11, wherein the clamp circuit further includes a third resistor coupled between the control electrode of the third transistor and the second current electrode of the third transistor.

13. The ESD protection circuit of claim 10, wherein the trigger circuit includes:

a first inverter stage including:

a first trigger transistor having a first current electrode, a second current electrode coupled at a third voltage supply node, a control electrode coupled at a first trigger node;

a second trigger transistor having a first current electrode coupled at the first output of the trigger circuit, a second current electrode coupled at the first current electrode of the first trigger transistor, a control electrode coupled at a second trigger node; and a second inverter stage including:

a third trigger transistor having a first current electrode coupled at the second output of the trigger circuit, a second current electrode coupled at the third voltage supply node, a control electrode coupled at the first trigger node.

14. The ESD protection circuit of claim 13, wherein the trigger circuit further includes:

an R-C stage coupled between the second voltage supply node and the third voltage supply node; and a third inverter stage having an input coupled to an output of the R-C stage and an output coupled to an input of the first and second inverter stages.

15. The ESD protection circuit of claim 10, further comprising a voltage divider circuit coupled with the trigger circuit, the voltage divider circuit having a first tap and configured to generate a first reference voltage at the first tap.

16. An electrostatic discharge (ESD) protection circuit comprising:

a clamp circuit coupled between a first voltage supply node and a second voltage supply node, the clamp circuit including:

a first transistor having a first current electrode, a second current electrode coupled at the second voltage supply node, a control electrode coupled to the second voltage supply node by way of a first resistor, and a body electrode coupled at the second voltage supply node;

a second transistor having a first current electrode, a second current electrode coupled at the first current electrode of the first transistor at a first clamp node, a control electrode, and a body electrode coupled at the second current electrode;

a third transistor having a first current electrode coupled at the first voltage supply node, a second current electrode coupled at the first current electrode of the second transistor at a second clamp node, a control electrode, and a body electrode coupled at the second current electrode;

a first bias generator circuit coupled at the control electrode of the second transistor;

a second bias generator circuit coupled at the control electrode of the third transistor; and a trigger circuit coupled with the clamp circuit, the trigger circuit having a first output coupled at the control electrode of the first transistor, a second output coupled at the control electrode of the second transistor, and a third output coupled at the control electrode of the third transistor.

17. The ESD protection circuit of claim 16, further comprising a voltage divider circuit coupled with the trigger circuit, the voltage divider circuit having a first tap and configured to generate a first reference voltage at the first tap.

18. The ESD protection circuit of claim 17, wherein the trigger circuit is coupled to receive the first reference voltage during a normal operating mode.

19. The ESD protection circuit of claim 16, wherein the first bias generator circuit comprises a second resistor having a first terminal coupled at the control electrode of the second transistor and a second terminal coupled at the second current electrode of the second transistor, and wherein the second bias generator circuit comprises a third resistor having a first terminal coupled at the control electrode of the third transistor and a second terminal coupled at the second current electrode of the third transistor.

20. The ESD protection circuit of claim 16, wherein the first bias generator circuit is configured such that a voltage at the first clamp node is substantially equal to ⅓ of the voltage at the first voltage supply node, and wherein the second bias generator circuit is configured such that a voltage at the second clamp node is substantially equal to ⅔ of the voltage at the first voltage supply node.

* * * * *